US012748472B2

(12) United States Patent
Abbas

(10) Patent No.: US 12,748,472 B2
(45) Date of Patent: Sep. 29, 2026

(54) SELF-INTERRUPTING POWER DEVICE USING A RELAY IN RESPONSE TO HEARTBEAT SIGNALS

(71) Applicant: Vitalchat, Inc., Ashburn, VA (US)

(72) Inventor: Ghafran Abbas, Ashburn, VA (US)

(73) Assignee: Vitalchat, Inc., Ashburn, VA (US)

( * ) Notice: Subject to any disclaimer, the term of this patent is extended or adjusted under 35 U.S.C. 154(b) by 231 days.

(21) Appl. No.: 18/530,952

(22) Filed: Dec. 6, 2023

(65) Prior Publication Data

US 2025/0190036 A1 Jun. 12, 2025

(51) Int. Cl.
*G06F 1/26* (2006.01)

(52) U.S. Cl.
CPC .................................... *G06F 1/26* (2013.01)

(58) Field of Classification Search
None
See application file for complete search history.

(56) References Cited

U.S. PATENT DOCUMENTS 6,341,354 B1 * 1/2002 Lee ...................... G06F 1/3287 713/324
2007/0202837 A1 * 8/2007 Araki ................ H04W 52/0225 455/343.3
2010/0106992 A1 * 4/2010 Schauer ........... G05B 19/41865 713/323
2012/0313454 A1 * 12/2012 Montena ................ H01R 13/70 307/115
2014/0225456 A1 * 8/2014 Teppans .................. G06F 1/325 307/116
2021/0400537 A1 * 12/2021 Zhang ...................... H04L 47/28
2023/0421403 A1 * 12/2023 Cook ....................... H04W 4/20
2024/0072840 A1 * 2/2024 Woodburn .............. H04W 4/80
2025/0103344 A1 * 3/2025 McMillan ............. G06F 9/4406

* cited by examiner

*Primary Examiner* — Danny Chan
(74) *Attorney, Agent, or Firm* — Young Basile Hanlon & MacFarlane, P.C.

(57) ABSTRACT

A system for controlling a flow of electricity from a first power supply using a relay. A relay controller powered by a second power supply and configured to control operations of the relay. An electronic device configured to transmit heartbeat signals to the relay controller. The relay controller is configured to terminate the flow of electricity in response to detecting a cessation of the heartbeat signals and restart the flow of electricity after terminating the flow of electricity.

20 Claims, 6 Drawing Sheets

SELF-INTERRUPTING POWER DEVICE USING A RELAY IN RESPONSE TO HEARTBEAT SIGNALS

FIELD

This disclosure relates generally to automatic power cycling based on the cessation of heartbeat signals.

SUMMARY

A first aspect is a system for a self-interrupting power device. The system includes a relay configurable to control a flow of electricity from a first power supply; a relay controller powered by a second power supply and configured to control operations of the relay; and an electronic device configured to transmit heartbeat signals that are received by the relay controller, wherein the relay controller is configured to: terminate the flow of electricity in response a cessation of the heartbeat signals; and restart the flow of electricity after terminating the flow of electricity.

A second aspect is a method for a self-interrupting power device. The method includes detecting, by a power device, a cessation of receipt of heartbeat signals from an electronic device; in response to detecting, by the power device, the cessation of the heartbeat signals; stopping, by the power device, a flow of electricity from a power source to the electronic device; and restarting, by the power device, the flow of electricity to the electronic device after stopping the flow of electricity to the electronic device.

A third aspect is an apparatus for a self-interrupting power device. The apparatus includes a relay; and a relay controller that includes processing circuitry configured to execute instructions to: detect a cessation of receipt of heartbeat signals; stop, in response to detecting the cessation of the heartbeat signals, a flow of electricity to the electronic device; and restart the flow of electricity to the electronic device.

These and other aspects of the present disclosure are disclosed in the following detailed description of the embodiments, the appended claims, and the accompanying figures.

It will be appreciated that aspects can be implemented in any convenient form. For example, aspects may be implemented by appropriate computer programs which may be carried on appropriate carrier media which may be tangible carrier media (e.g., disks) or intangible carrier media (e.g., communications signals). Aspects may also be implemented using suitable apparatus which may take the form of programmable computers running computer programs arranged to implement the methods and/or techniques disclosed herein. Aspects can be combined such that features described in the context of one aspect may be implemented in another aspect.

BRIEF DESCRIPTION OF THE DRAWINGS

The disclosure is best understood from the following detailed description when read in conjunction with the accompanying drawings.

Figure 1:
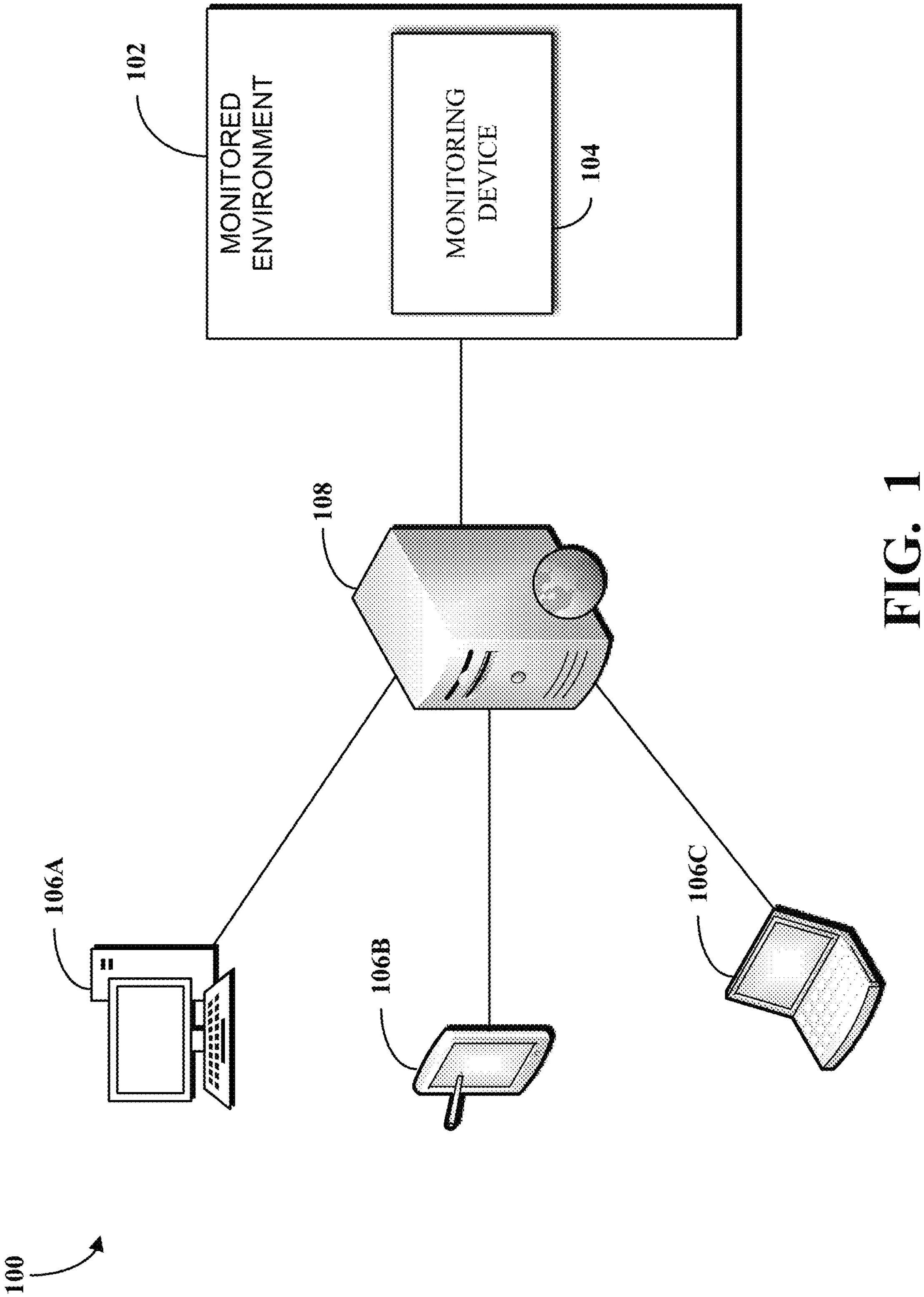
FIG. 1 is an schematic of an example of a system according to implementations of this disclosure.

These and other aspects of the present disclosure are disclosed in the following detailed description of the embodiments, the appended claims, and the accompanying figures.

It will be appreciated that aspects can be implemented in any convenient form. For example, aspects may be implemented by appropriate computer programs which may be carried on appropriate carrier media which may be tangible carrier media (e.g., disks) or intangible carrier media (e.g., communications signals). Aspects may also be implemented using a suitable apparatus, which may take the form of programmable computers running computer programs arranged to implement the methods and/or techniques disclosed herein. Aspects can be combined such that features described in the context of one aspect may be implemented in another aspect.

DETAILED DESCRIPTION

Managing devices in modern technological environments, such as commodity hardware like computers, cameras, and other peripherals, poses significant challenges. These devices, often used in settings that require hands-off management, sometimes malfunction in ways that necessitate a physical power cycle-essentially unplugging and then reconnecting them to the power supply. It is crucial for such devices to proactively self-monitor and self-effectuate a power cycle, without manual or remote intervention, to ensure they operate optimally and pass all diagnostics.

The main issue is detecting the need for a power cycle and effectuating the power cycle without human or remote intervention. No existing solutions or approaches can address these needs. Firstly, it is noted that conventional reboot procedures fall short in addressing this need, as they do not fully cut off power in a way that physically unplugging a device does.

Presently, three solutions or approaches are used to address the need to power cycle a device. The first is a manual power cycle, requiring physical disconnection and reconnection of the device to the power supply, which is at least time-consuming and operationally inefficient, especially when devices are in hard-to-reach or secured locations. The second is an automated, timed power cycle, which can lead to unnecessary downtime as it operates on a fixed schedule without regard to the device's actual need for a reboot. The third is a remote power cycle, which can be triggered on-demand. None of these solutions or approaches address the need for self-effectuating a power cycle at a device without manual or remote intervention.

Implementations according to this disclosure can automatically trigger a power cycle upon detecting the cessation of heartbeat signals from the connected device. This allows the monitored device to be automatically power cycled without requiring manual intervention and only when the power cycle is needed to correct a malfunction. A connect device (e.g., a computer) is connected to a power device. The power device powers the connected device. That is any power (e.g., electricity) that powers the connected device flow through and is controlled by the power device. The power device receives heartbeat signals from the connected device. If the power device does not receive a heartbeat signal, the power device temporarily terminates the flow of electricity to the connected device therewith causing a connected device to power cycle (e.g., the reset).

To illustrate, an in-room monitoring system with a connected camera may stop responding due to a malfunction between the camera and the computing device. The computing device may stop responding because the camera is no longer operational. As such the computing device stops sending heartbeat signals to the power device. Once the power device detects that the heartbeat signals are no longer being received, the power device may automatically perform a power cycle.

In some implementations, a power cycle can be triggered remotely. For example, the power device may receive a remote command to power cycle the connected device. Upon receiving the remote command, the power device temporarily cuts off the power to the connected device. As such, the power device can power cycle the connected device proactively and/or reactively.

Details of a self-interrupting power device are described herein with initial reference to a system in which the teachings herein can be implemented.

FIG. 1 is a schematic of an example of a system 100 according to implementations of this disclosure. The system 100 includes a monitored environment 102, a monitoring device 104, a user device 106, and a server 108.

The monitored environment 102 can be a patient hospital room, a nursing home room, a room of a home patient, a manufacturing line, a workstation, a laboratory, and the like. The monitored environment 102 includes and/or can be viewed using the monitoring device 104. The monitored environment 102 can be remotely monitored from the user device 106. The user device 106 can be one or more of a desktop computer 106A, a mobile device 106B (such as tablet, a smart phone, and the like), a laptop computer 106C, or some other device that can be used to access, communicate with, and/or control (directly or indirectly) the monitoring device 104. A user (not shown) of the user device 106 can monitor the monitored environment 102 via the monitoring device 104. That the monitored environment 102 is remotely monitored by the user means that the user may not physically be in the monitored environment 102 while performing the monitoring.

In the case that the monitored environment 102 is a patient hospital room, the user can be a physician, a nurse, another health-care practitioner, a family member of the patient, and/or the like. For example, the physician may be remotely responding to (e.g., diagnosing, mitigating, assessing, etc.) a patient emergency or remotely performing patient rounds. The nurse may be monitoring patients, including the monitored environment 102 from a nurses station to, for example, ensure that no patient is falling, is in need of help, is distressed, and/or the like. The family member of the patient may remotely visit with the patient using the monitoring device 104.

The monitoring device 104 can be configured to and/or used to capture video, images, audio, environmental conditions, or other characteristics of the monitored environment. The characteristics of the monitored environment can be transmitted to one or more users of the user devices 106. Via the user device 106, the user can interact with the monitoring device, such as by sending and/or receiving captured video and/or audio, sending commands to the monitoring device 104, and the like.

The user device 106 and the monitoring device 104 can communicate via the server 108. For example, the user device 106 can send commands to the server 108, which relays the command to the monitoring device. Similarly, the monitoring device 104 can send information to the server 108, which relays the information to the user device 106.

To illustrate, the monitoring device 104 can include a camera that is configured to view the monitored environment 102. The user device 106 can issue a request to the server 108 to establish a connection with the monitoring device 104. The server 108 can establish the connection. Issuing a request to the server 108 to establish a connection can include, for example, the user device 106 connecting to a patient by the patient's room number or name; the server 108 determining the monitoring device 104 of the patient (i.e., the monitoring device that is in the patient's room); and the server 108 connecting the user device 106 and the monitoring device 104. The connection session may be an video communication session during which the user can communicate visually and/or verbally with a person in the patient's room. The user device 106, may during the connection session, send a pan, tilt, or zoom (PTZ) command to the camera of the monitoring device 104 via the server 108. The monitoring device 104 can update the view of the monitored environment according to the PTZ command and send back, via the server 108, a video and/or image of the updated view of the monitored environment, which can then be displayed on a display of the user device 106. In an example, the server 108 can allow certain users to control monitoring device and not allowing other user devices to control the monitoring device.

In another example (not shown), the user device 106 can establish a peer-to-peer communication channel with the monitoring device 104. For example, in response to the connection request, the server 108 can facilitate the establishment of the peer-to-peer (e.g., direct) communication between the user device 106 and the monitoring device 104.

The server 108 can be deployed (e.g., physically located) on premise at the location of the monitored environment. The server 108 can be deployed on a same local area network (LAN) of the monitoring device 104. The server 108 can be deployed on a same wide area network (WAN) of the monitoring device 104. The server 108 can be a cloud-based server. Other deployments of the server 108 are possible.

The monitoring device 104, the user device 106, and the server 108 can communicate over any suitable network. The network (not shown) can be, for example, the Internet or an Internet Protocol (IP) network, such as the World Wide Web. The network can be a LAN, a WAN, a virtual private network (VPN), cellular telephone network, a private network, an extranet, an intranet, any other means of transferring information (e.g., video streams, audio streams, images, other information), or a combination thereof from one end point to another end point.

In an example, the user device 106 and the monitoring device 104 may communicate using a real-time transport protocol (RTP) for transmission of the media content, which may be encoded, over the network. In another implementation, a transport protocol other than RTP may be used (e.g., a Hypertext Transfer Protocol-based (HTTP-based) streaming protocol). For example, the user device 106 can transmit and/or receive media content (e.g., audio and/or video content) to and/or from the monitoring device 104 via WebRTC, which provides web browsers and mobile applications with real-time communication. However, the disclosure herein is not so limited and any other real-time transmission protocol can be used.

Figure 2:
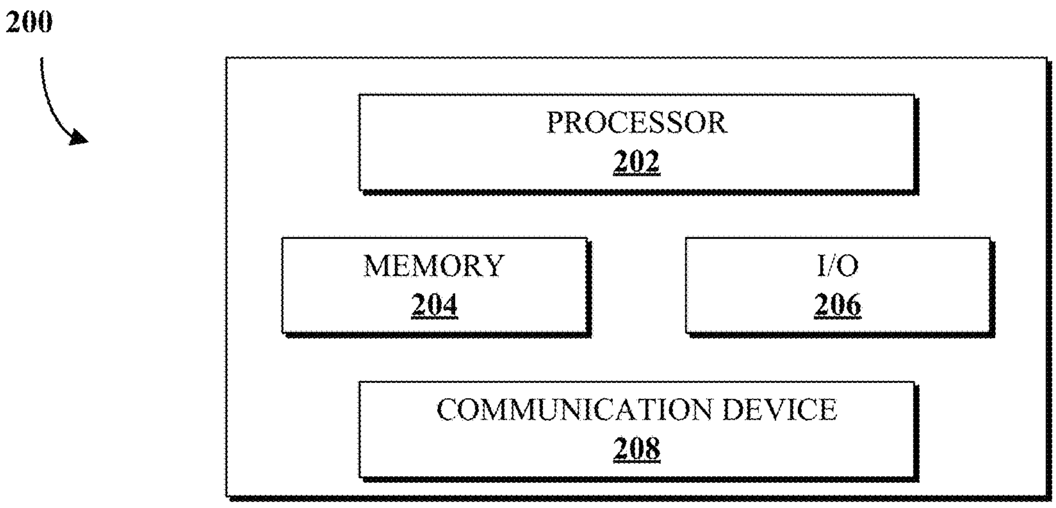
FIG. 2 is a block diagram of an example of a computing device.

FIG. 2 is a block diagram of an example of a computing device 200. Each of the monitoring device 104, the user device 106, or the server 108 can be implemented, at least partially, by the computing device 200.

The computing device 200 can be implemented by any configuration of one or more computers, such as a microcomputer, a mainframe computer, a supercomputer, a general-purpose computer, a special-purpose/dedicated computer, an integrated computer, a database computer, a remote server computer, a personal computer, a laptop computer, a tablet computer, a cell phone, a personal data assistant (PDA), a wearable computing device, or a computing service provided by a computing service provider, for example, a web host or a cloud service provider. In some implementations, the computing device can be implemented in the form of multiple groups of computers that are at different geographic locations and can communicate with one another, such as by way of a network. While certain operations can be shared by multiple computers, in some implementations, different computers are assigned to different operations. In some implementations, the system 100 can be implemented using general-purpose computers/processors with a computer program that, when executed, carries out any of the respective methods, algorithms, and/or instructions described herein. In addition, or alternatively, for example, special-purpose computers/processors including specialized hardware can be utilized for carrying out any of the methods, algorithms, or instructions described herein.

The computing device 200 can have an internal configuration of hardware including a processor 202 and a memory 204. The processor 202 can be any type of device or devices capable of manipulating or processing information. In some implementations, the processor 202 can include a central processor (e.g., a central processing unit or CPU). In some implementations, the processor 202 can include a graphics processor (e.g., a graphics processing unit or GPU). Although the examples herein can be practiced with a single processor as shown, advantages in speed and efficiency can be achieved by using more than one processor. For example, the processor 202 can be distributed across multiple machines or devices (each machine or device having one or more processors) that can be coupled directly or connected via a network (e.g., a local area network). The memory 204 can include any transitory or non-transitory device or devices capable of storing executable codes and data that can be accessed by the processor (e.g., via a bus). The memory 204 herein can be a random-access memory (RAM) device, a read-only memory (ROM) device, an optical/magnetic disc, a hard drive, a solid-state drive, a flash drive, a security digital (SD) card, a memory stick, a compact flash (CF) card, or any combination of any suitable type of storage device. In some implementations, the memory 204 can be distributed across multiple machines or devices, such as in the case of a network-based memory or cloud-based memory. The memory 204 can include data (not shown), an operating system (not shown), and an application (not shown). The data can include any data for processing (e.g., an audio stream, a video stream, a multimedia stream, user commands, and/or other data). The application can include programs that permit the processor 202 to implement instructions to generate control signals for performing functions of the techniques in the following description.

In some implementations, in addition to the processor 202 and the memory 204, the computing device 200 can also include a secondary (e.g., external) storage device (not shown). When present, the secondary storage device can provide additional memory when high processing needs exist. The secondary storage device can be a storage device in the form of any suitable non-transitory computer-readable medium, such as a memory card, a hard disk drive, a solid-state drive, a flash drive, or an optical drive. Further, the secondary storage device can be a component of the computing device 200 or can be a shared device accessible via a network. In some implementations, the application in the memory 204 can be stored in whole or in part in the secondary storage device and loaded into the memory 204 as needed for processing.

In addition to the processor 202 and the memory 204, the computing device 200 can include input/output (I/O) devices. For example, the computing device 200 can include an I/O device 206. The I/O device 206 can be implemented in various ways, for example, it can be a display that can be coupled to the computing device 200 and configured to display a rendering of graphics data. The I/O device 206 can be any device capable of transmitting a visual, acoustic, or tactile signal to a user, such as a display, a touch-sensitive device (e.g., a touchscreen), a speaker, an earphone, a light-emitting diode (LED) indicator, or a vibration motor. The I/O device 206 can also be any type of input device either requiring or not requiring user intervention, such as a keyboard, a numerical keypad, a mouse, a trackball, a microphone, a touch-sensitive device (e.g., a touchscreen), a sensor, or a gesture-sensitive input device. If the I/O device 206 is a display, for example, it can be a liquid crystal display (LCD), a cathode-ray tube (CRT), or any other output device capable of providing a visual output to an individual. In some cases, an output device can also function as an input device. For example, the output device can be a touchscreen display configured to receive touch-based input.

The I/O device 206 can alternatively or additionally be formed of a communication device for transmitting signals and/or data. For example, the I/O device 206 can include a wired means for transmitting signals or data from the computing device 200 to another device. For another example, the I/O device 206 can include a wireless transmitter or receiver using a protocol compatible to transmit signals from the computing device 200 to another device or to receive signals from another device to the computing device 200.

In addition to the processor 202 and the memory 204, the computing device 200 can optionally include a communication device 208 to communicate with another device. Optionally, the communication can be via a network. The network can be one or more communications networks of any suitable type in any combination, including, but not limited to, networks using Bluetooth communications, infrared communications, near-field communications (NFCs), wireless networks, wired networks, local area networks (LANs), wide area networks (WANs), virtual private networks (VPNs), cellular data networks, or the Internet. The communication device 208 can be implemented in various ways, such as a transponder/transceiver device, a modem, a router, a gateway, a circuit, a chip, a wired network adapter, a wireless network adapter, a Bluetooth adapter, an infrared adapter, an NFC adapter, a cellular network chip, or any suitable type of device in any combination that is coupled to the computing device 200 to provide functions of communication with the network.

The computing device 200 can also include or be in communication with an image-sensing device (not shown), for example a camera, or any other image-sensing device now existing or hereafter developed that can sense an image such as the image of a user operating the computing device 200 or a view of a monitored environment. The image-sensing device can be positioned such that it is directed to capture a view of the monitored environment. For example, the image-sensing device can be directed toward a patient and/or a patient bed in a hospital room. In an example, the position and optical axis of the image-sensing device can be configured and/or controlled such that the field of vision (i.e., the view) includes an area of interest.

The computing device 200 can also include or be in communication with a sound-sensing device, for example a microphone, or any other sound-sensing device now existing or hereafter developed that can sense sounds near the computing device 200. The sound-sensing device can be positioned or controlled to be positioned such that it is directed toward a monitored environment so as to capture speech, other utterances, or other sounds within the monitored environment. The sound-sensing device can be configured to receive sounds, for example, speech or other utterances made by the user while the user operates the computing device 200. The computing device 200 can also include or be in communication with a sound playing device.

The computing device 200 (and any algorithms, methods, instructions, etc., stored thereon and/or executed thereby) can be realized in hardware including, for example, intellectual property (IP) cores, application-specific integrated circuits (ASICs), programmable logic arrays, optical processors, programmable logic controllers, microcode, firmware, microcontrollers, servers, microprocessors, digital signal processors, or any other suitable circuit. In this disclosure, the term "processor" should be understood as encompassing any the foregoing, either singly or in combination. The terms "signal," "data," and "information" are used interchangeably.

Figure 3:
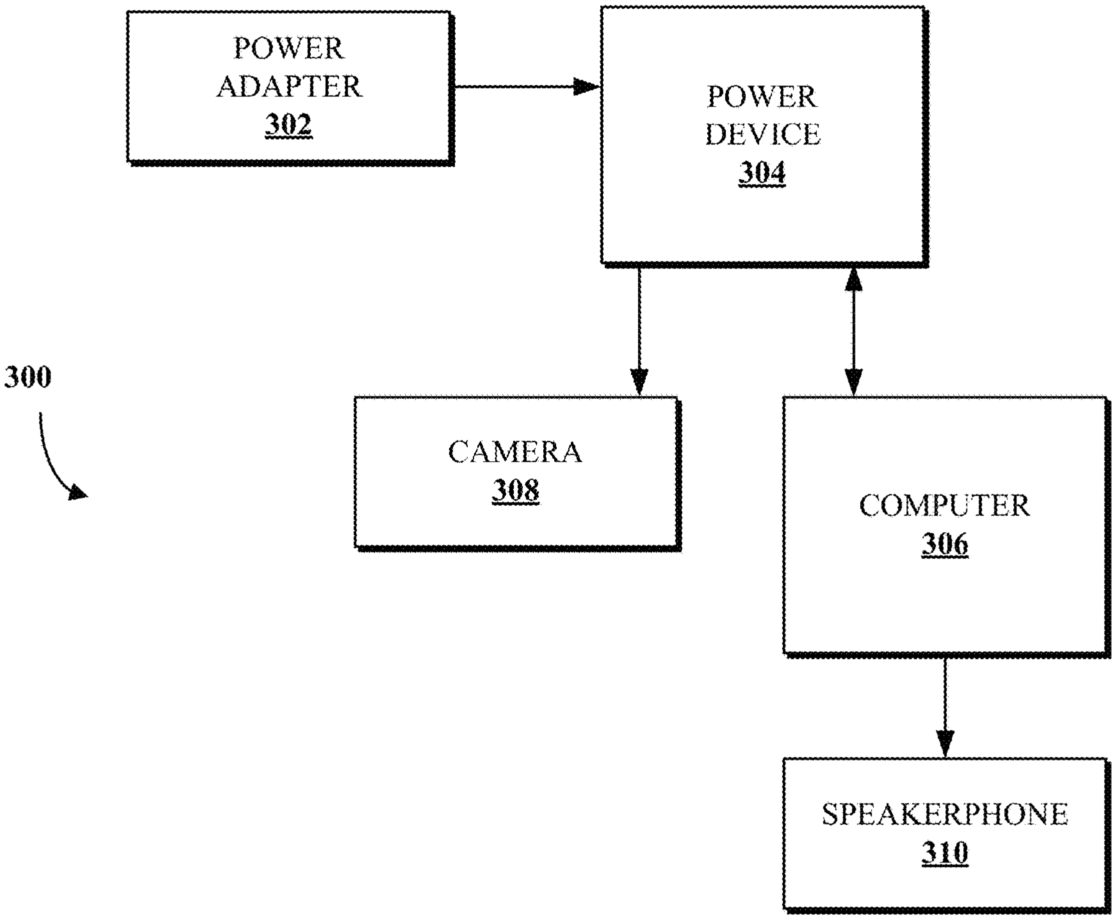
FIG. 3 is a block diagram of an example of a system according to implementation of this disclosure.

FIG. 3 is a block diagram of an example of a system 300 according to implementations of this disclosure. The system 300 includes a power adapter 302, a power device 304, a computer 306, a camera 308, and a speakerphone 310.

The power adapter 302 can be any power supply capable of supplying power from a wall outlet to an electronic device such as the computer 306, the camera 308, the speakerphone 310, or the like. The computer 306 may be the computing device 200 of FIG. 2 or the monitoring device 104 of FIG. 1. In either case, the power adapter 302 supplies (i.e., delivers) power to the power device 304. The power device 304 may supply power to any electronic device such as the computer 306, the camera 308, the speakerphone 310, or the like. Additionally, the power device 304 may receive power from an electronic device (e.g., the computer 306) via a universal serial bus (USB) connection. The power device 304 may also receive a signal from the electronic device via the USB connection.

Alternatively, the power device 304 may receive power from the computer 306 via the USB connection while simultaneously supply power to another electronic device (e.g., the camera 308). In this case, the power supplied by the power adapter 302 flows from the power adapter 302 to the power device 304 and to the camera 308.

The computer 306 may be connected to some other peripheral or external device, such as a speakerphone 310. The speakerphone 310 may be the sound sensing device as described above in relation to FIG. 2.

Figure 4:
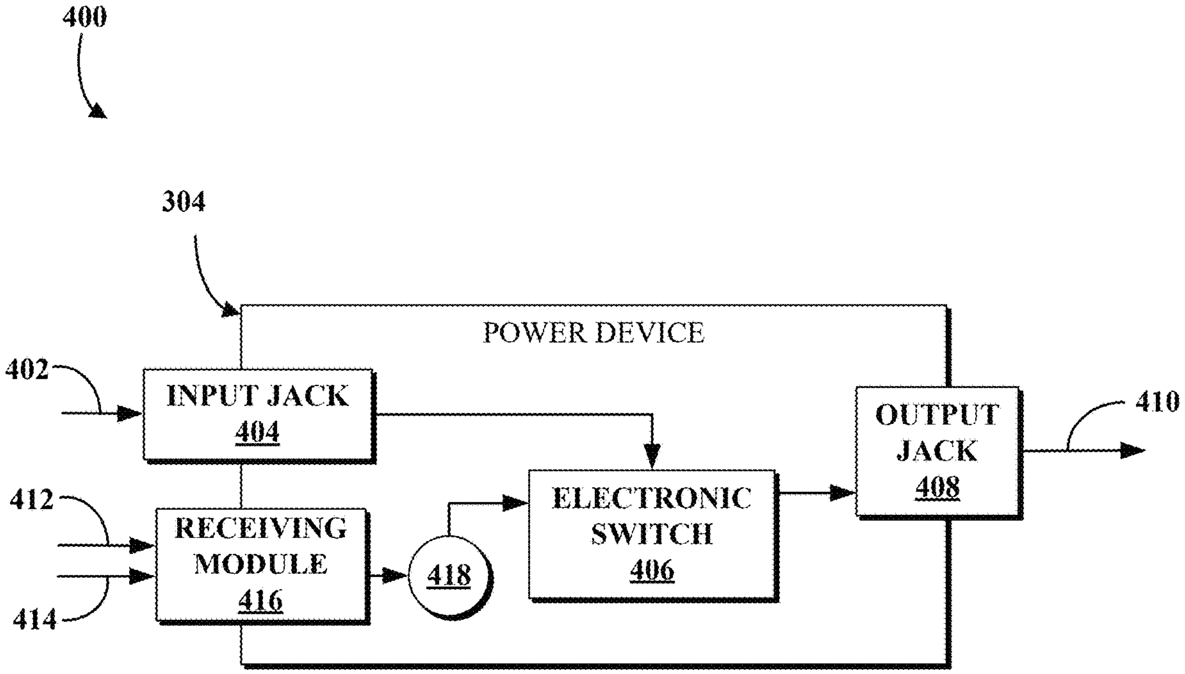
FIG. 4 is a block diagram of a power device.

FIG. 4 is a block diagram of the power device 304 of FIG. 3. The power device 304 may receive an input flow of electricity 402 from a power source (such as the power adapter 302 of FIG. 3). The input flow of electricity 402 is received at an input jack 404. The input flow of electricity 402 is routed via the input jack 404 to an electronic switch 406. The electronic switch 406 may be a power relay module, a switching transistor, or the like. When closed, the electronic switch 406 enables the input flow of electricity 402 to flow to an output jack 408. Via the output jack 408, the input flow of electricity 402 is routed out as an output flow of electricity 410. In other words, the electronic switch 406 receives power from an input flow of electricity 402 for delivery to an output flow of electricity 410.

An input signal 412 and a secondary input flow of electricity 414 may be received by a receiving module 416. The receiving module 416 may be microcontroller (such as an Arduino® Uno, an Arduino® micro, an Arduino® Nano, or the like). The receiving module 416 may receive power from the secondary input flow of electricity 414. The secondary input flow of electricity 414 may be received via a USB connection. The USB connection may be USB 1.x, USB 2.0, USB 3.x, or USB4. Additionally, the USB connection may be Standard-A, Standard-B, Mini-A, Mini-AB, Mini-B, Micro-A, Micro-AB, Micro-B, or Type-C connection.

The receiving module 416 may be configured to receive heartbeat signals, via the input signal 412, at a regular interval (e.g., every 15 seconds, every 30 second, every 45 seconds, etc.). If the receiving module 416 does not receive the heartbeat signals at the regular interval the receiving module 416 may send a signal to an electronic switch controller 418 (i.e., relay controller). The electronic switch controller 418 may receive the signal from the receiving module 416 and send a signal to the electronic switch 406 instructing the electronic switch 406 to open. As such, the input flow of electricity 402 is stopped (i.e., interrupted) from flowing to the output jack 408.

The heartbeat signals are received from an electronic device, such the computer 306 of FIG. 3. In an example, a monitoring program, application, instructions or the like may be executing at or otherwise implemented at the electronic device. The monitoring program may monitor different conditions related to the electronic device. The monitoring program may be configured to transmit a heartbeat signal in response to determining that the monitored conditions (e.g., collectively, individually, or in combination) are not such that the electronic device should be power cycled. To illustrate, and without limitations, the monitoring program may monitor processor usage and if the processor usage exceeds 70%, a heartbeat signal is not transmitted. As another illustration, the monitoring program may additionally monitor whether communication with a peripheral device (e.g., a camera) is no longer possible and, accordingly, a heartbeat signal will not be transmitted to the power device.

Alternatively, the receiving module 416 may be configured to receive a command signal (e.g., reboot signal), via the input signal 412. If the receiving module 416 receives the command signal the receiving module 416 may send a signal to the electronic switch controller 418 instructing the electronic switch controller 418 to open the electronic switch 406.

Figure 5:
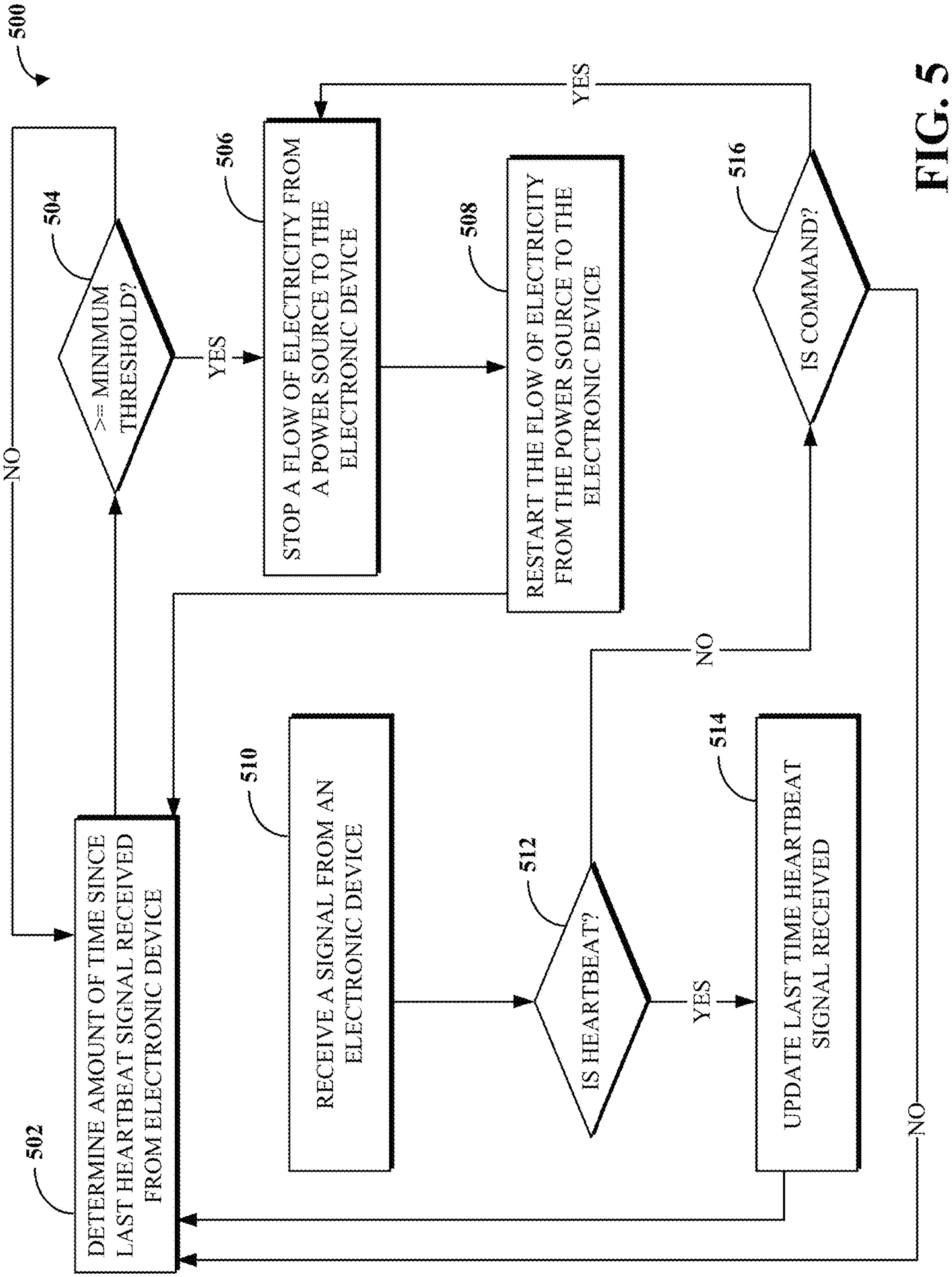
FIG. 5 is an example flowchart of a technique for a self-interrupting power supply according to an implementation of this disclosure.

FIG. 5 includes a flowchart diagram of a technique 500 for a self-interrupting power supply. The technique 500 can be stored in a memory, such as the memory 204 of FIG. 2, as instructions that can be executed by a processor (such as the receiving module 416 of FIG. 4) of a micro-controller (such as an Arduino® Uno, an Arduino® micro, an Arduino® Nano, or the like). In some implementations, some or all operations of the technique 500 may be performed on a microcontroller, such as by the receiving module 416 of FIG. 4.

At 502, the amount of time since the last heartbeat signal was received from an electronic device is determined. The heartbeat signals (e.g., the input signal 412 of FIG. 4) may be received via a USB connection between the receiving module 416 and the electronic device, which can be the computer 306 of FIG. 3. At 504, the amount of time since the last heartbeat signal was received is compared to a minimum threshold. The minimum threshold is a configured minimum amount of time that may pass between two consecutively received heartbeat signals before a power cycle is automatically performed. If the amount of time since the last heartbeat signal was received is greater than or equal to the minimum threshold, the technique 500 proceeds to 506. If the amount of time since the last heartbeat signal was received is less than the minimum threshold the technique 500, the technique 500 proceeds back to 502. The minimum threshold can be set to any positive integer. In an example, the minimum threshold value may be set to 30 seconds.

At 506, a flow of electricity from a power source to the electronic device is stopped. That is, the receiving module 416 sends a signal (i.e., a small voltage current) to the electronic switch controller 418. As a result, the electronic switch controller 418 causes the circuit between the electronic switch controller 418 and the electronic switch 406 to close, which in turn causes the electronic switch 406 to open therewith stopping the flow of electricity from the power source to the electronic device. For example, the power device 304 may be connected to receive power from a power source and connected to supply power to a computer (e.g. disposed inline). Additionally, the computer may be connected to the receiving module 416 of the power device 304 via a USB connection.

The electronic device may be configured to send heartbeat signals to the receiving module 416 at an interval. In an example, the interval can equal to the minimum threshold. In an example, the interval can be shorter than the minimum threshold. For example, the interval can be 15 seconds and the minimum threshold on the power device 304 may be set to 30 seconds. As such, if the electronic device fails to transmit heartbeat signals to the receiving module two consecutive times, the amount of time since the last heartbeat signal was received becomes greater than or equal to the minimum threshold, at 504. This may be due to insufficient resources on the computer or temporary hardware or software failure. More generally, the heartbeats may not be received from the electronic device for whatever reasons/conditions that the monitoring application executing at the electronic device determines necessitate that a heartbeat should not be transmitted. In any case, when the amount of time since the last heartbeat signal was received becomes equal to or greater than the minimum threshold, the flow of electricity from the power source to the computer is stopped causing the computer to turn off.

At 508, the flow of electricity from the power source to the electronic device is restarted. The flow of electricity may be restarted instantaneously or after a predetermined amount of time. To restart the flow of electricity, the electronic switch controller 418 opens the circuit between the electronic switch controller 418 and the electronic switch 406. This causes the electronic switch 406 to close and the flow of electricity to the electronic device to be restarted. In an example, the predetermined amount of time may be 60 seconds or some other predetermined amount of time. The receiving module 416 will continue to send the low voltage current to the electronic switch controller 418 for 60 seconds. After the 60 seconds have elapsed, the receiving module 416 will cease to send the low voltage current to the electronic switch controller 418 and the electronic switch controller 418 will open. When the electronic switch controller 418 opens, the circuit between the electronic switch controller 418 and the electronic switch 406 is opened and the electronic switch 406 closes allowing the electricity between the power supply and the electronic device to continue.

At 510, a signal is received from an electronic device. The electronic device may be the monitoring device 104 of FIG. 1, the computer 306 of FIG. 3, or another computing device (such as the computing device 200 of FIG. 2). The signal may originate from a software (e.g., a monitoring application) executing at the electronic device. The signal may be received by the receiving module 416 via a USB connection. For example, the receiving module 416 of FIG. 4 may be a microcontroller (e.g., Arduino® micro, an Arduino® Nano, etc.) and the signal can be the input signal 412, as described with respect to FIG. 4. The signal may be a heartbeat signal or a command signal.

At 512, the technique 500 determines whether the signal is a heartbeat signal. If the signal is a heartbeat signal, the technique 500 continues to 514. If the signal is not a heartbeat signal, the technique 500 continues to 516.

At 514, the last time a heartbeat signal was received is updated. For example, a variable used to determine the amount of time since the last heartbeat signal was received can be updated to the current time (e.g., the time of receipt of the heartbeat signal).

At 516, the technique 500 determines whether the signal received is a command signal. A command signal may be received from the electronic device or from a remote device, other than the electronic device. If the signal is a command signal, the technique 500 continues to 506. If the signal was not a command signal, the technique 500 continues to 502. The command signal can be an explicit command directing the power device to power cycle the electronic device.

Figure 6:
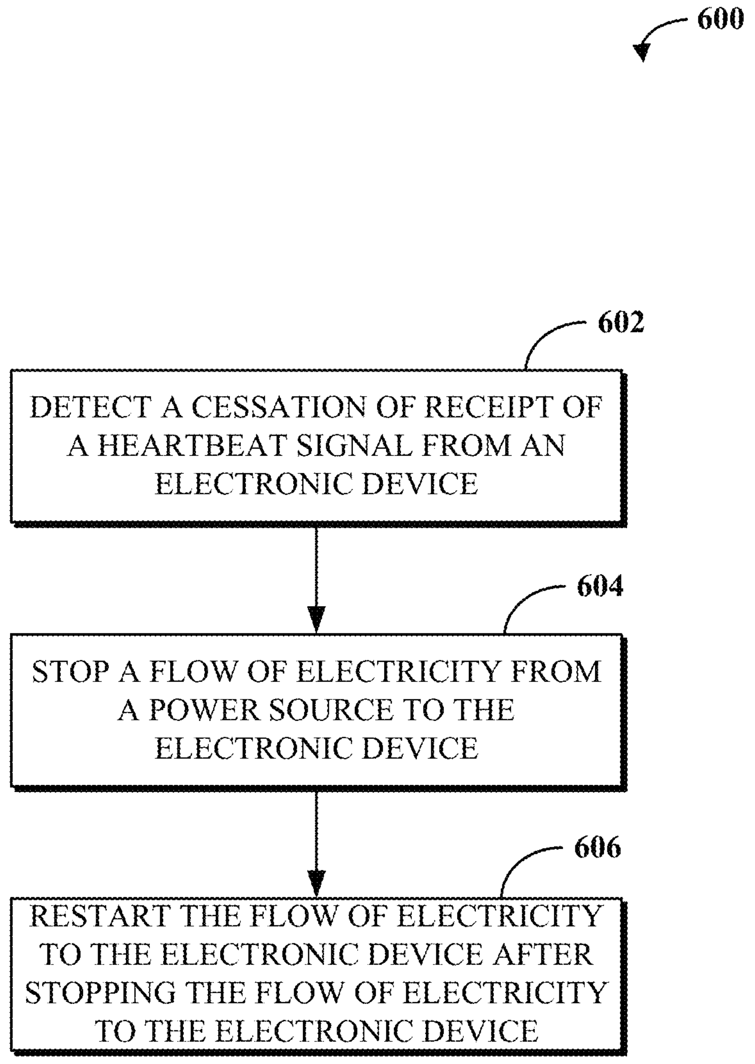
FIG. 6 is an example of a technique for power-cycling an electronic device using a power device.

FIG. 6 is an example of a technique 600 for power-cycling an electronic device using a power device. The technique 600 can be implemented, for example, as a software program that may be executed by a power device such as the power device 304 of FIGS. 3 and 4. The software program can include machine-readable instructions that may be stored in a memory such as the memory 204 of FIG. 2, and that, when executed by a processor, such as the processor 202 of FIG. 2, may cause the power device to perform the technique 600.

At 602, the power device detects a cessation of receipt of heartbeat signals from the electronic device. As mentioned above, the power device expects to receive heartbeat signals at regular intervals. That is, a first heartbeat signal (e.g., a first instance of the heartbeat signal) may be received followed, after a certain amount of time, by a second heartbeat signal (e.g., a second instance of the heartbeat signal), and so on. In response to detecting, by the power device, the cessation of the heartbeat signal, the power device stops (i.e., interrupts) a flow of electricity from a power source to the electronic device, at 604; and then the power device restarts the flow of electricity to the electronic device, at 606.

Stopping the flow of electricity to the electronic device can include configuring a relay of the power device to stop the flow of electricity to the electronic device. The relay receives the electricity from a power supply for delivery to the electronic device. The relay can be controlled by a relay controller. The power device can be powered by another power source that is different from the power source. The other power source can be the electronic device.

In an example, a command signal can be received by the power device from a remote device. In response to receiving the command signal, the power device stops the flow of electricity to the electronic device.

Figure 7:
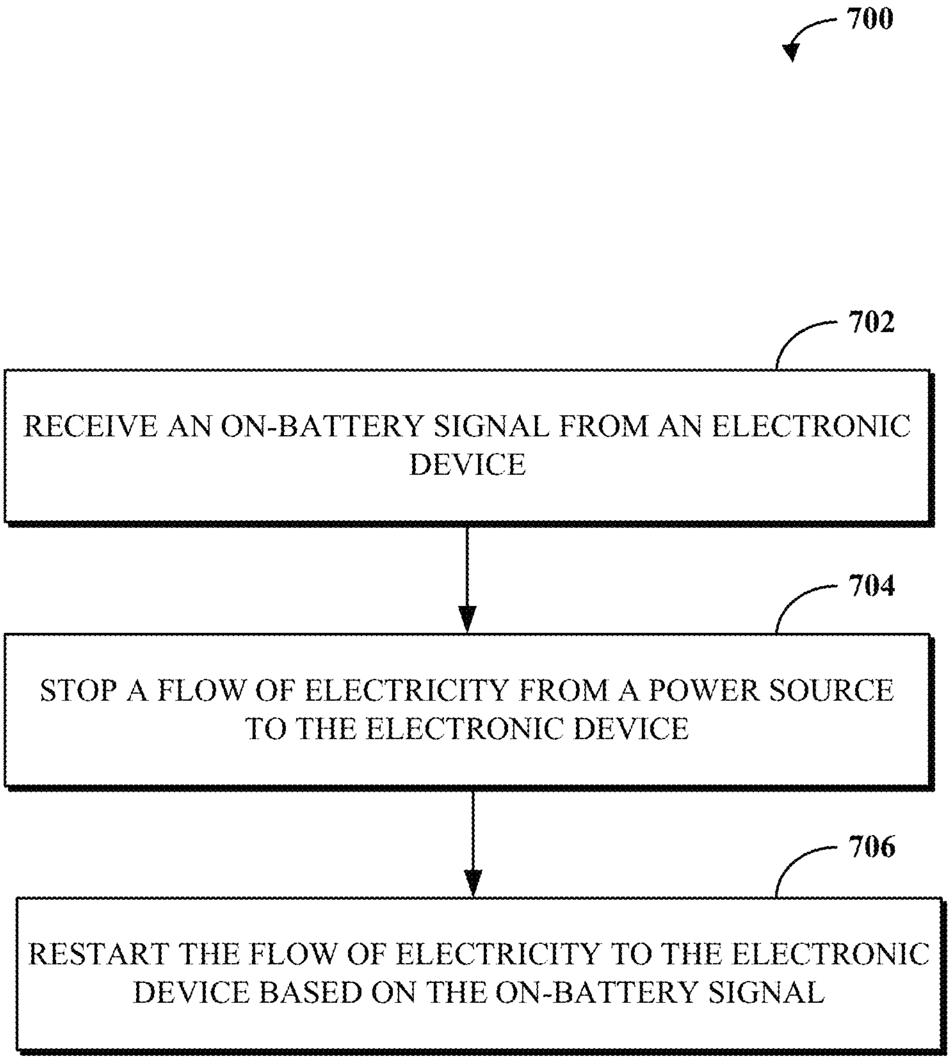
FIG. 7 is an example of a technique for power-cycling an electronic device using a power device.

FIG. 7 is an example of a technique 700 for power-cycling an electronic device using a power device. The technique 700 can be implemented, for example, as a software program that may be executed by a power device such as the power device 304 of FIGS. 3 and 4. The software program can include machine-readable instructions that may be stored in a memory such as the memory 204 of FIG. 2, and that, when executed by a processor, such as the processor 202 of FIG. 2, may cause the power device to perform the technique 700.

In some situations, it can be useful to delay the restart of the flow of electricity to the electronic device, such as when the electronic device is additionally battery powered. In such cases, re-starting the flow of electricity immediately (or shortly after) stopping the flow of electricity as described with respect to FIG. 5, may not accomplish the desired goal of power-cycling the electronic device.

In some implementations, the heartbeat signal may include an indication of a remaining battery life (in seconds). That is, the heartbeat signal may indicate the expected amount of time before complete depletion of the battery. As such, every time the power device receives a heartbeat signal, the power device maintains (e.g., updates) a variable (e.g., a "remaining battery life" variable) indicating the battery state of the electronic device. In response to determining to power-cycle (such as described with respect to FIG. 5), the power device restarts the flow of electricity, at 508 of FIG. 5, after the passage of enough time sufficient for the battery to completely drain.

Additionally, the electronic device may send more than one on-battery signal to the power device. The electronic device may send the on-battery signal to the power device at regular intervals. Each subsequent on-battery signal may indicate an updated delay time based on the current battery life remaining.

In other implementations, the electronic device may stop sending heartbeat signals, not because it is incapable of sending heartbeat signals, but to indicate to the power device to power cycle the electronic device. As such, after cessation of sending of the heartbeat signals, the electronic device may transmit on-battery signals to indicate to the power device the expected remaining battery time of the electronic device. In an example, when the power device stops receiving on-battery signals (e.g., does not receive on-battery signals for a threshold amount of time), the power device restarts the flow of electricity. In another example, when the power device does not receive on-battery signals within the threshold time, the power device waits for an amount of time that is at least equal to the remaining battery life before restarting the flow the electricity.

According to the foregoing, in an implementation, at 702, the power device receives an on-battery signal from the electronic device. As mentioned, the electronic device may have encountered an issue and a power cycle may be requested; however, the electronic device also has a battery. As such, the electronic device may notify the power device of the battery using the on-battery signal.

At 704, the power device stops the flow of electricity from a power source to the electronic device. The on-battery signal may modify the amount of time the power device will delay restarting the flow of electricity to the electronic device. At 706 the power device restarts the flow of electricity to the electronic device based on the on-battery signal. That is, the power device may delay restarting the flow of electricity based on an amount of time specified by the no-battery signal.

For simplicity of explanation, the techniques 500, 600, and 700 of FIGS. 5, 6, and 7, respectively, are each depicted and described as a respective series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a system. The system includes a relay configurable to control a flow of electricity from a first power supply. The system also includes a relay controller powered by a second power supply and configured to control operations of the relay. The system also includes an electronic device configured to transmit heartbeat signals, where the heartbeat signals are received by the relay controller, and where the relay controller is configured to: terminate the flow of electricity in response to determining a cessation of the heartbeat signals, and restart the flow of electricity after terminating the flow of electricity.

Implementations may include one or more of the following features. The system where determining the cessation of the heartbeat signals may include: receiving a first heartbeat signal, and determining that a second heartbeat signal is not received within a predetermined amount of the first heartbeat signal. The flow of electricity can extend from a source to the electronic device via the relay. The relay controller can be configured to receive the heartbeat signals from the electronic device using a universal serial bus connection between the relay controller and the electronic device. The second power supply can extend from the electronic device to the relay controller. The relay controller can be exclusively powered by the electronic device. Implementations of the described techniques may include hardware, a method or process, or computer software on a computer-accessible medium.

One general aspect includes a method. The method includes detecting, by a power device, a cessation of receipt of a heartbeat signals from an electronic device. The method also includes, in response to detecting, by the power device, the cessation of the heartbeat signals: stopping, by the power device, a flow of electricity from a power source to the electronic device; and restarting, by the power device, the flow of electricity to the electronic device after stopping the flow of electricity to the electronic device. Other embodiments of this aspect include corresponding computer systems, apparatus, and computer programs recorded on one or more computer storage devices, each configured to perform at least some of the actions of the methods.

Implementations may include one or more of the following features. The method where stopping the flow of electricity to the electronic device may include: configuring a relay of the power device to stop the flow of electricity to the electronic device, where the relay receives the electricity from a power supply for delivery to the electronic device. The relay can be controlled by a relay controller. The power device can be powered by another power source that is different from the power source. The another power source is the electronic device. The heartbeat signals are received via a universal serial bus connection. The method the method may include: receiving, by the power device, a command signal from a remote device; and in response to receiving the command signal, stopping, by the power device, the flow of electricity to the electronic device. Implementations of the described techniques may include hardware, a method or process, or computer software on a computer-accessible medium.

One general aspect includes an apparatus. The apparatus includes a relay; and a relay controller may include processing circuitry configured to execute instructions to: detect a cessation of receipt of heartbeat signals from an electronic device; stop, in response to detecting the cessation of the heartbeat signals, a flow of electricity to the electronic device; and restart the flow of electricity to the electronic device. Other embodiments of this aspect include corresponding computer systems, apparatus, and computer programs recorded on one or more computer storage devices, each configured to perform the actions of the methods.

Implementations may include one or more of the following features. The apparatus where the electronic device can be a computer. The heartbeat signals can be received from software executed by the computer. The flow of electricity to the electronic device can be stopped using the relay. The relay can be controlled by the relay controller. The relay controller can receive the heartbeat signals using a universal serial bus connection between the electronic device and the relay controller. The processing circuitry can be configured to execute instructions to: receive a command signal from a remote device; stop, in response to receiving the command signal, the flow of electricity to the electronic device; and restart the flow of electricity to the electronic device.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the power device 304, and/or any of the components therein described with respect to FIG. 3 (and the techniques, algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system, comprising:

a relay, disposed inline between a first power supply and an electronic device, configurable to physically interrupt a flow of electricity from the first power supply, wherein the electronic device includes a battery as an alternative power source;

a relay controller powered by a second power supply and configured to control operations of the relay; and the electronic device configured to transmit heartbeat signals, wherein the heartbeat signals are received by the relay controller via a universal serial bus (USB) connection between the relay controller and the electronic device, and wherein the relay controller is configured to:

determine a delay time based on a remaining battery life indication of the electronic device included in the heartbeat signals, wherein the delay time corresponds to an amount of time sufficient to deplete the battery;

open the relay, in response to determining a cessation of the heartbeat signals, to terminate the flow of electricity;

wait, after opening the relay, until the delay time elapses before restarting the flow of electricity to the electronic device; and close the relay after terminating the flow of electricity to restart the flow of electricity.

2. The system of claim 1, wherein determining the cessation of the heartbeat signals comprises:

receiving a first heartbeat signal, and determining that a second heartbeat signal is not received within a predetermined amount of the first heartbeat signal.

3. The system of claim 1, wherein the flow of electricity extends from a source to the electronic device via the relay.

4. The system of claim 1, wherein the second power supply extends from the electronic device to the relay controller.

5. The system of claim 4, wherein the relay controller is exclusively powered by the electronic device.

6. The system of claim 1, wherein the heartbeat signals are transmitted at a regular interval, and the relay controller is configured to:

determine the cessation of the heartbeat signals based on an amount of time since a last received heartbeat signal and a minimum time threshold.

7. A method, comprising:

detecting, by a power device, a cessation of receipt of a heartbeat signals from an electronic device, wherein the heartbeat signals includes a remaining battery life indication and are received from the electronic device by a relay controller of the power device via a universal serial bus connection (USB); and in response to detecting, by the power device, the cessation of the heartbeat signals:

determining a delay time based on the remaining battery life indication;

opening a relay of the power device to stop a flow of electricity from a power source to the electronic device, wherein the power device is disposed inline between the power source and the electronic device and the power device is configurable to physically interrupt the flow of electricity from the power source to the electronic device;

waiting, after opening the relay, until the delay time elapses before restarting the flow of electricity to the electronic device; and closing the relay of the power device to restart the flow of electricity to the electronic device after stopping the flow of electricity to the electronic device.

8. The method of claim 7, wherein stopping the flow of electricity to the electronic device comprises:

configuring the relay of the power device to stop the flow of electricity to the electronic device by sending a signal from the relay controller to the relay.

9. The method of claim 8, wherein the relay is controlled by the relay controller.

10. The method of claim 9, wherein the relay controller is powered by another power source that is different from the power source.

11. The method of claim 10, wherein the another power source is the electronic device.

12. The method of claim 7, the method further comprising:

receiving, by the power device, a command signal from a remote device; and in response to receiving the command signal, stopping, by the power device, the flow of electricity to the electronic device.

13. The method of claim 7, comprising:

receiving, by the power device, one or more on-battery signals from the electronic device, each on-battery signal indicating an updated remaining battery life of the electronic device; and updating, by the power device, the delay time based on the updated remaining battery life.

14. An apparatus, comprising:

a relay configurable to physically interrupt a flow of electricity; and a relay controller comprising processing circuitry configured to execute instructions to:

detect a cessation of receipt of heartbeat signals from an electronic device, wherein the relay controller receives the heartbeat signals using a universal serial bus (USB) connection between the electronic device and the relay controller and the heartbeat signals include a remaining battery life indication;

determine a delay time based on the remaining battery life indication;

open the relay, in response to detecting the cessation of the heartbeat signals, to stop the flow of electricity to the electronic device;

wait, after opening the relay, until the delay time elapses before restarting the flow of electricity to the electronic device; and close the relay to restart the flow of electricity to the electronic device.

15. The apparatus of claim 14, wherein the electronic device is a computer.

16. The apparatus of claim 15, wherein the heartbeat signals are received from software executed by the computer.

17. The apparatus of claim 14, wherein the flow of electricity to the electronic device is stopped using the relay.

18. The apparatus of claim 17, wherein the relay is controlled by the relay controller.

19. The apparatus of claim 14, wherein the processing circuitry is further configured to execute instructions to:

receive a command signal from a remote device;

stop, in response to receiving the command signal, the flow of electricity to the electronic device; and restart the flow of electricity to the electronic device.

20. The apparatus of claim 14, wherein the relay controller includes a microcontroller configured to receive the heartbeat signals and to control the relay based on the heartbeat signals.

* * * * *